(12) United States Patent
Olivier et al.

(10) Patent No.: US 9,952,109 B2
(45) Date of Patent: Apr. 24, 2018

(54) MICROBAROMETER WITH A BELLOWS AND WITH AN INTERFEROMETRIC TRANSDUCER

(71) Applicant: Commissariat A L'Energie Atomique et Aux Energies Alternatives, Paris (FR)

(72) Inventors: Serge Olivier, Bruyeres le Chatel (FR); Damien Ponceau, Antony (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 137 days.

(21) Appl. No.: 14/655,162

(22) PCT Filed: Dec. 18, 2013

(86) PCT No.: PCT/FR2013/053168
§ 371 (c)(1),
(2) Date: Jun. 24, 2015

(87) PCT Pub. No.: WO2014/102486
PCT Pub. Date: Jul. 3, 2014

(65) Prior Publication Data
US 2016/0195445 A1    Jul. 7, 2016

(30) Foreign Application Priority Data

Dec. 27, 2012  (FR) ..................... 12 62878

(51) Int. Cl.
*G01L 7/06* (2006.01)
*G01L 11/02* (2006.01)
(52) U.S. Cl.
CPC ............... *G01L 7/06* (2013.01); *G01L 11/02* (2013.01)

(58) Field of Classification Search
CPC .......... G01H 17/11; G01H 17/00; G01L 7/06; G01L 7/0695; G01L 7/065
See application file for complete search history.

(56) References Cited

U.S. PATENT DOCUMENTS

| 4,665,747 A | 5/1987 | Muscatell |
| 2011/0098950 A1 | 4/2011 | Carr |
| 2012/0063716 A1* | 3/2012 | Mizuno ............. G02B 6/12007 385/11 |

FOREIGN PATENT DOCUMENTS

| CN | 101055336 A | 10/2007 |
| DE | 3621862 A1 | 2/1987 |

(Continued)

OTHER PUBLICATIONS

Buchner et al. (DE 239868 A1), Oct. 1986, EPO Computer Translation.*

(Continued)

*Primary Examiner* — Erika J Villaluna
(74) *Attorney, Agent, or Firm* — Brinks Gilson & Lione

(57) ABSTRACT

A microbarometer includes a reference base, a bellows having a first edge fixed to a reference surface of the base and having an elongation direction perpendicular to the reference surface. A cover closes a second edge of the bellows and sealingly insulates an interior volume thereof. The bellows configured such that variations in elongation are directly proportional to pressure variations induced by infrasonic waves. A reflective element is integral the cover and an interferometric component receives a beam from a source is integral with the reference surface of the base. An input/output optical path faces the reflective element and is parallel to the elongation direction of the bellows, so as to emit a beam fraction towards the reflective element and to sense the reflected beam after reflection from reflective element. The interferometric component including inte- (Continued)

grated optical guide lines and optical separation and combination zones within a substrate.

11 Claims, 4 Drawing Sheets

(56) References Cited

FOREIGN PATENT DOCUMENTS

WO     WO 96/02820     2/1996
WO     WO 03/046498 A1     6/2003

OTHER PUBLICATIONS

LePichon, A. et al., "Low-noise Broad Band Microbarometers", Infrasound Monitoring for Atmospheric Studies, 2009, Book, ISBN: 978-1-4020-9507-8, 6 pages.
Dawei, Liang et al.,"Interferometric Fiber Optic Pressure Sensor", Fiber Optics and Laser Sensors, vol. 1169, pp. 286-291.
Office Action issued in corresponding Chinese application No. 201380067937.4 dated Aug. 3, 2016, 14 pages.

* cited by examiner

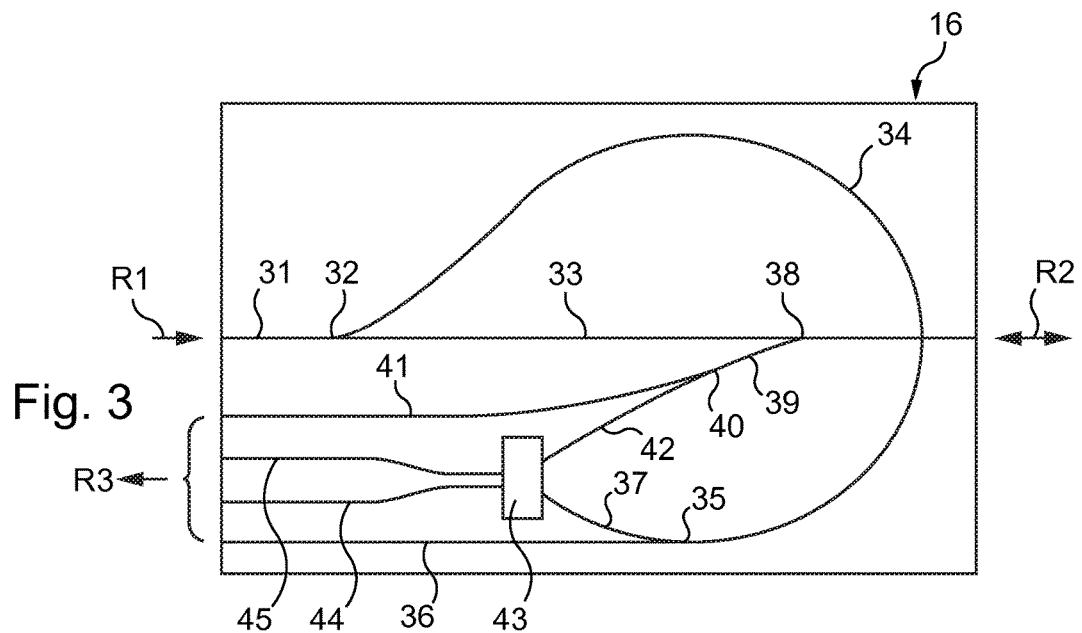
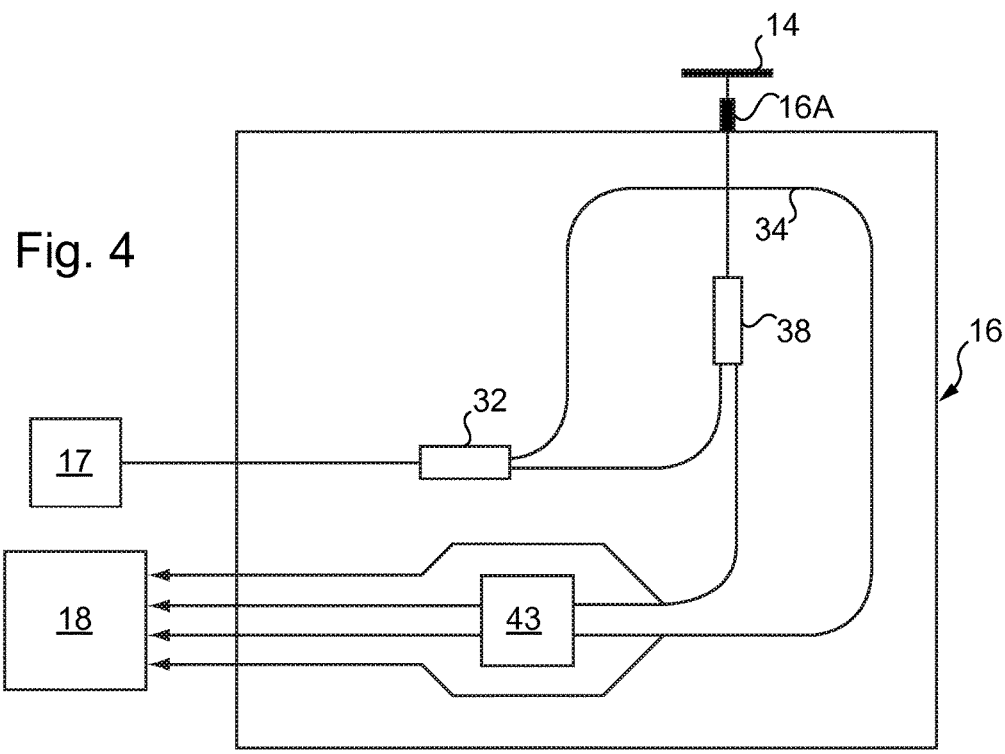

MICROBAROMETER WITH A BELLOWS AND WITH AN INTERFEROMETRIC TRANSDUCER

RELATED APPLICATIONS

This application is a U.S. nationalization of PCT application No. PCT/FR2013/053168, filed Dec. 18, 2013 and published as PCT publication No. WO2014/102486 on Jul. 3, 2014, the disclosure of which is incorporated by reference herein.

TECHNICAL FIELD

The invention concerns microbarometers with a bellows.

BACKGROUND

These instruments are conventionally used for the measurement of infrasonic waves also called infrasound, that is to say with very small pressure variations (typically comprised in the range from a millipascal to around a hundred pascals) of which the frequency is less than 20 Hz; these instruments measure the shape of the waves more than the intensity of the corresponding signal. These instruments are of a very different type to that of barometers, which measure the atmospheric pressure, that is to say values of the order of $10^5$ Pa, with an accuracy of the order of about a hundred, or a thousand, pascals.

Infrasonic waves are in particular produced by events, whether or not natural, of which the following (non-exhaustive) list gives an idea of the extent of the applications: the study of volcanic eruptions, the study and monitoring of the reentry into the atmosphere of meteorites or satellites at the end of life, counting and location of avalanches, monitoring nuclear explosions, measuring gravity waves induced by the movements of convection in the atmosphere, the study of atmospheric models, studies of inaudible waves generated by wind turbines, trains, aircraft, underground trains.

On account of their very low frequency, infrasonic waves have the property of propagating over long distances in the various layers of the atmosphere while being appreciably less attenuated than waves in the audible range: several times around the earth for high-energy phenomena such as nuclear explosions, several thousand kilometers for certain natural phenomena such as volcanic eruptions.

To efficiently measure infrasonic waves, microbarometers must have the following performance:
- sensitivity of the order of the mPa, i.e. $10^{-8}$ below ambient atmospheric pressure,
- intrinsic noise less than the minimum noise measured at the surface of the Earth,
- bandwidth enabling the useful detection bands (0.001 Hz to 10 Hz) to be covered and if possible the absolute static pressure of the location;
- flat response within the bandwidth,
- highest possible dynamic range of measurement to detect all the phenomena without needing to filter the low frequencies (gravity waves), or even the continuous component which is the pressure of the location, variable according to altitude.
- resonance frequency which must be situated outside the detection band,
- very little influence by the external temperature on the sensor, which would then be confused with low frequency waves.

Microbarometers with a bellows have existed for approximately 50 years. They use the principle of barometric measurement to access the variations in pressure from zero to 20 Hz. The reference pressure is a primary vacuum enclosed in an anaerobic capsule of bellows form generally disposed vertically on a base. Any variation in pressure deforms that bellows while generating linear displacement in its upper part. In the existing technologies, this displacement is measured by an electromagnetic sensor of LVDT type (LVDT being an acronym for "Linear Variable Differential Transformer"), that is to say a passive electrical (inductive) sensor of linear displacements, as is described in particular in the publication "LDG microbarometers: description and performances—Network design—Gérard Ruzié—Ghislain Claque—CTBTO Informal infrasound workshop May 2 to 4, 1996 CEA Bruyères-le-Châtel France."

Microbarometers with a bellows, associated with their electromagnetic sensors, have been optimized over several decades by the specialists of infrasonic waves who conventionally master the mechanics of accuracy and electromagnetism. This is the case with the microbarographs of MB 2000 and MB 2005 type developed by the CEA since the 1970's.

Despite the numerous optimizations, the current microbarometers with a bellows have a limited spectral band of measurement, are sensitive electromagnetic perturbations and maintain a degree of thermal sensitivity on account of the mounting.

SUMMARY

The invention relates to a microbarometer of which the design enables those limitations to be overcome, in combination with a capability of being used outside a laboratory context, by virtue of a small overall bulk.

To that end, it provides a microbarometer with a bellows comprising:
- a reference base,
- a bellows of which one edge is fastened to a reference surface of that base, while having a elongation direction perpendicular to that reference surface,
- a cover closing the other edge of that bellows so as to isolate it in fluid-tight manner in relation to the exterior, the bellows being placed in conditions in which its variations of elongation are directly proportional to the pressure variations induced by infrasonic waves around it,
- a reflective member joined to that cover
- and an interferometric component configured to be able to receive a beam from a source, joined to the reference surface of the base and having an input/output path facing the reflective member, parallel to the direction of elongation of the bellows, so as to be able to emit to that member a beam fraction and collect that beam after reflection on that reflective member, that component comprising optical guide lines, zones of optical splitting and combining within a same substrate, using integrated technology.

The invention thus makes provision to abandon the LVDT electromagnetic technology practiced for 50 years by the specialists of microbarometers with a bellows by introducing a completely different technology. For this, the invention provides for the use of an interferometric transducer instead of and in place of an electromagnetic transducer, hitherto unknown to the person skilled in the art in the field of microbarometers with a bellows.

It should be noted that the use of an optical technology has already been envisioned for a measurement of displacement.

Thus, in a field that is a little different, several laboratories have attempted to use an interferometric measurement in seismometers, such as described for example in the publication Zumberge M., Berger J., Dzieciuch M. A., and Parker R. L., "Resolving quadrature fringes in real time", Applied Optics, Vol. 43, No. 4, 2004. There is proposed therein a Michelson interferometer in which two quadrature fringes are analyzed in real time to provide a displacement transducer with a broad bandwidth and wide dynamic range of which the resolution is $5.10^{-13}$ m·Hz$^{-1/2}$ at 2 Hz.

Such interferometers implement a plurality of waveplates, beamsplitters and cube reflectors, in a configuration that requires precise adjustment of each optical element, which makes them complex to implement, and fragile in relation to use in the field over a number of years.

It is reasonable to think that such complexity and those constraints of use have until now dissuaded the specialists in the field of microbarometers from taking an interest in this technology.

Contrary to this prejudice, the invention provides for the use of a particular optical technology, that is to say what is referred to as integrated optics technology, hitherto confined to the circles of optics science in particular applied to biological and astronomical instrumentation applications (see the document by Malbet F., Kern P., Schanen-Duport I., Berger J.-P., Rousselet-Perraut K. and Benech P. "Integrated optics for astronomical interferometry" I: Concept and astronomical applications. Astronomy and Astrophysics supplement, vol. 138, pp. 135-145, July 1999); it may be added that the optical circuits which were envisioned in those scientific applications had a layout of optical guides and interferometric mixing quite different from those involved in the invention.

More particularly, the invention provides that the subdivision of the initial beam into two fractions, the guiding of one of those fractions towards the mirror carried by the bellows, the collection of the reflected fraction and its combination with the other fraction before outputting interferometry signals, be carried out by optical guides etched into a substrate, typically of silica, using micrometric-scale or even nanometric-scale etching technologies known in microtechnology (the term nanotechnology is also used today).

It can be understood that, since the various optical elements (splitters, retarders, or combiners, as well as the guide paths linking them) are formed within a same substrate, their individual configurations and also their relative configuration may be defined with high precision, which avoids any later adjustment, while eliminating the risks of maladjustment in case of use in a perturbed environment, on some or other external terrain.

This technology furthermore has the advantage of enabling minimization of the dimensions: an optical substrate integrating the splitting and mixing functions may have a size of the order of the centimeter, i.e. which may be integrated into a microbarometer (or even into the bellows—see below).

According to optional features, which may possibly be combined:
- the bellows is disposed between the reference surface and the interferometric component, the reflective member being mounted on the outside face of the cover; such a configuration makes easy any connection with external elements, in particular a coherent optical source or a processing device,
- the interferometric component is joined to the reference surface via pillars disposed around the bellows; this contributes to obtaining good rigidity for the assembly, even in the case of a perturbed environment,
- in the aforementioned configuration, the pillars are formed from a mixture of metal and invar, in proportions such that their coefficient of thermal expansion perpendicular to the reference surface is substantially equal to that of the bellows; this makes it possible to obtain measurements substantially independent from the variations in the ambient temperature,
- according to another configuration, the reflective member and the integrated optics interferometric component are disposed inside the bellows, the reflective member being mounted on the inside face of the cover and the interferometric component being situated along the reference surface of the base; this results in minimization of the bulk as well as preservation of the members internal to the bellows with regard to external aggressions. On account of the disappearance of the pillars, this configuration also has the really significant advantage of minimizing the influence of temperature on the measurement,
- the interferometric component is formed from a silica substrate of which the zones have been modified, for example by etching, exposure and/or ion diffusion, so as to form the said optical lines, the splitting and combining zones; this amounts to forming index gradients, or even discontinuities delimiting optical guides, based on a substrate of which the properties in the nanotechnologies field are well controlled,
- the microbarometer further comprises a lid surrounding the bellows and the interferometric component, which is fastened to the base and comprises inlet apertures for inletting outside air into the enclosed space constituted between the lid and the reference surface around the bellows, as well as connection conduits configured to enable an optical connection to a coherent monochromatic source of radiation and to a device for processing interferometric signals; this enclosed space is isolated in fluid-tight manner from the outside, apart from those apertures. This volume enables balancing of the outside pressure around the bellows, whatever the perturbations due to the local wind. These air inlet apertures are generally linked to external networks of filtering tubes to minimize the small variations due to the local wind. This makes it possible to ensure the access of possible variations in external pressure as far as the bellows while protecting it from the dust and condensation of the surrounding environment,
- the integrated optics interferometric component comprises an input for an input signal and four outputs, which are two outputs for interferometric signals in quadrature, one output for an input signal fraction and one output for the signal reflected by the reflective member; this enables very accurate processing of the interference signals, leading to accurate evaluations of the displacements of the cover of the bellows relative to the base and thus of the pressure variations and of the infrasonic waves which are at the origin thereof.
- the reflective member is a planar mirror, which is a particularly simple form of reflective member (even though many other forms are possible, in particular cat's eyes or corner cubes),
- the volume of the bellows is at a rough vacuum, which pre-stresses the bellows and contributes to promoting good proportionality between the pressure variations and the variations in length of the bellows resulting therefrom, as well as to keeping constant the internal pressure of the bellows, even in case of external temperature variation. It may however be understood that, instead of a rough vacuum, the bellows may be brought into an elastic regime of deformation by means of pre-stressed members that are mechanical in nature, for example in the form of springs.

BRIEF DESCRIPTION OF THE DRAWING

Objects, features and advantages of the invention will appear from the following description, given by way of illustrative non-limiting example with reference to the accompanying drawings in which:

FIG. 3 is a synoptic diagram of an integrated optics component capable of being implemented in the microbarometer of one or other of FIGS. 1 and 2, FIG. 4 is a synoptic diagram of a complete interferometry system implemented with the microbarometer of FIG. 1 or 2, integrating a unit according to claim 3.

DETAILED DESCRIPTION

Figure 1:
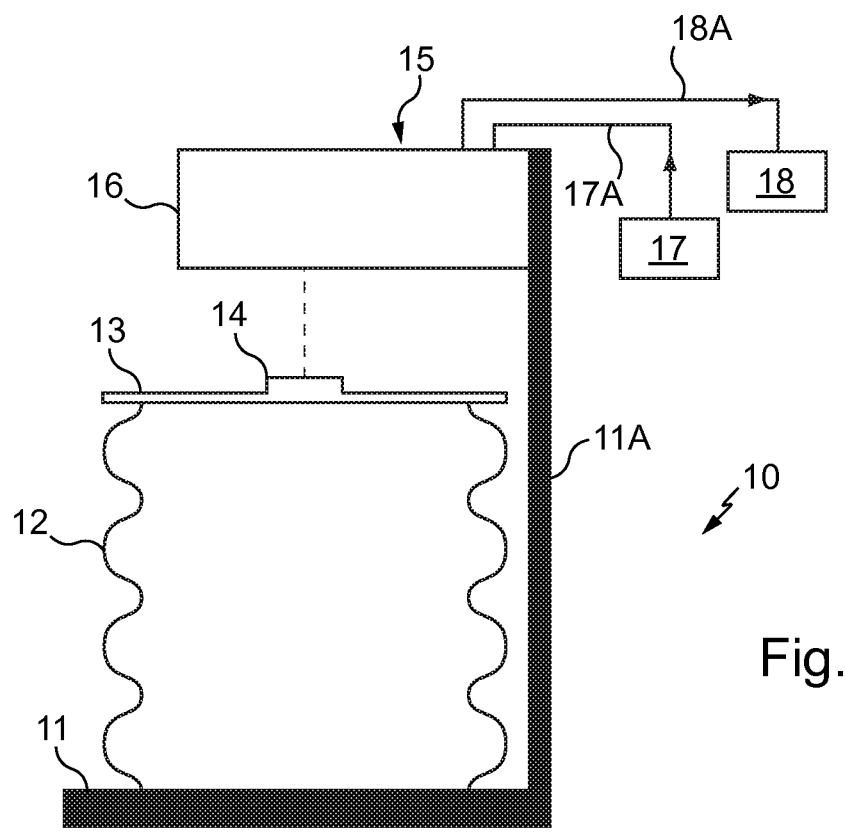
FIG. 1 is a synoptic diagram of a microbarometer according to the invention, in a first example embodiment, within a complete optical system.

FIG. 1 shows a synoptic diagram of a microbarometer with a bellows and with an optical transducer in accordance with a first example embodiment. It is designated under the general reference 10 and is constituted by the following members:

a base 11 which serves as a reference for any movement in the sensor, a fluid-tight bellows 12 of corrugated metal which is configured to deform linearly relative to the base, according to the variations in pressure between the inside and the outside of its volume; this bellows has an edge fastened in fluid-tight manner to the base a full disk forming a cover 13 which closes the bellows in fluid-tight manner at an opposite extreme to the base and therefore "follows" the deformation of the bellows relative to the base, a measurement mirror 14 bonded to the full disk 3, an optical interferometer (also called interferometric component here) 15 which is fixed relative to the base, by in practice being linked to it by spacers 11A called pillars here, and which is configured to measure the displacement of the mirror 14 relative to the base. This interferometric component and the associated mirror thus form an interferometric transducer of displacement.

As will be detailed later, the optical interferometer 15 comprises an integrated optics unit or component 16, a radiation source 17 linked to the unit 16 by an optical guide 17A and a processing device 18 linked to the unit 16 by an optical guide (or bundle of optical guides) 18A.

In its minimum definition, the microbarometer comprises only component 16, it being possible for the source 17 and the processing device 18 to be accessories which are connected to that minimum assembly only at the time of periods of operation. As will be seen later, the processing device does not necessarily provide real-time processing of the optical signals received from the optical component, and may merely store them for later use.

The surface of the base to which the bellows is fastened (here the upper surface of the base, it being possible for the latter to be placed in any location) constitutes a reference surface relative to which the displacement of the bellows cover must be measured; this surface is preferably planar.

The bellows 12 has elastic properties; it is in fact the component that is sensitive to the infrasonic waves, more exactly to the variations in pressure associated with those infrasonic waves. It is a cylinder formed from corrugated sheet metal closed at the ends by the base 11 at one end (on the reference surface thereof) and by the full disk 13 at the other end.

The pressure inside the bellows is a reference pressure relative to which are measured the variations in external pressure due to the infrasonic waves.

Preferably, the inside of the bellows is placed under a rough vacuum, which is operative to place the bellows in a pre-stressed configuration such that it is placed in its elastic domain; this is an efficient means to bring the bellows into compressive pre-stress, in its elastic regime of deformation, and ensure thereby that any variation in pressure induced by infrasonic waves results in an elongation (or retraction) which is proportional to it. This rough vacuum is also operative to define a reference pressure which remains constant, relative to which the measurement is made. The pressure difference between the outside (generally at atmospheric pressure) and the inside of the bellows defines an equilibrium, and thus a reference position of the bellows. The bellows must therefore be air-tight to maintain the rough vacuum. "Atmospheric pressure" (the term ambient pressure is also sometimes used) here designates the pressure present outside the bellows in the absence of any significant confinement with regard to the environment wherein the infrasonic waves are able to propagate; the value of that pressure, not considering any infrasound, may also substantially depend on the outside temperature and on the altitude of the measurement.

The cover 13 is similarly air-tight; the connections between the bellows and the base, and between the bellows and the cover, are also fluid-tight.

The mirror 14 is represented here in the form of a planar plate. Advantageously, the deformation characteristics of the bellows are such that a variation in the outside pressure results in a pure translation of that cover without rotation; in this way the mirror 14 maintains its parallelism in all the configurations which the bellows is able to take and at any time maintains its capacity to return in a given direction a beam received from the optical interferometer. However, there are mirrors the geometry of which enables this condition to be avoided, such as corner reflectors which have the property of returning a beam exactly in the direction of incidence.

The optical interferometer is represented as being formed from three members, that is to say a coherent optical source 17, typically a monochromatic laser source, an integrated optics unit configured to direct a fraction of the incident beam towards the mirror and to collect a beam reflected by it, to combine fractions of the incident and reflected beams, and to send those fractions to the processing device. At least one unit 16 is fixed relative to the base; it is however possible to have all these members fixed relative to the base.

The spacers 11A which provide for the fastening of that unit relative to the base advantageously have a coefficient of expansion, perpendicular to the reference surface of the base, which is the same as that of the bellows; this enables the effects of the variations in ambient temperature to be minimized.

The arrival of an infrasonic signal in the vicinity of the bellows results in a variation in the atmospheric pressure. The equilibrium of the bellows 12 is then modified, resulting in a variation in the position of the disk 13 relative to the base 11. To measure an infrasonic signal thus amounts to measuring the displacement of the disk 13 relative to the reference surface formed by the base 11.

The specificity of the microbarometer, relative to the known microbarometers, lies in the use of an interferometric technology to make the measurement of the displacement of the disk 13. More particularly, a combination is made between a fraction of the incident radiation and a fraction of the radiation reflected by the mirror 14, joined to the bellows cover, which gives interference fringes; these are modified when the mirror moves.

According to a complementary specification of the invention, the guiding of the fractions of radiation within the interferometer is carried out within a substrate modified within its volume, so as to form integrated optics; this will be exposited upon below.

Figure 2:
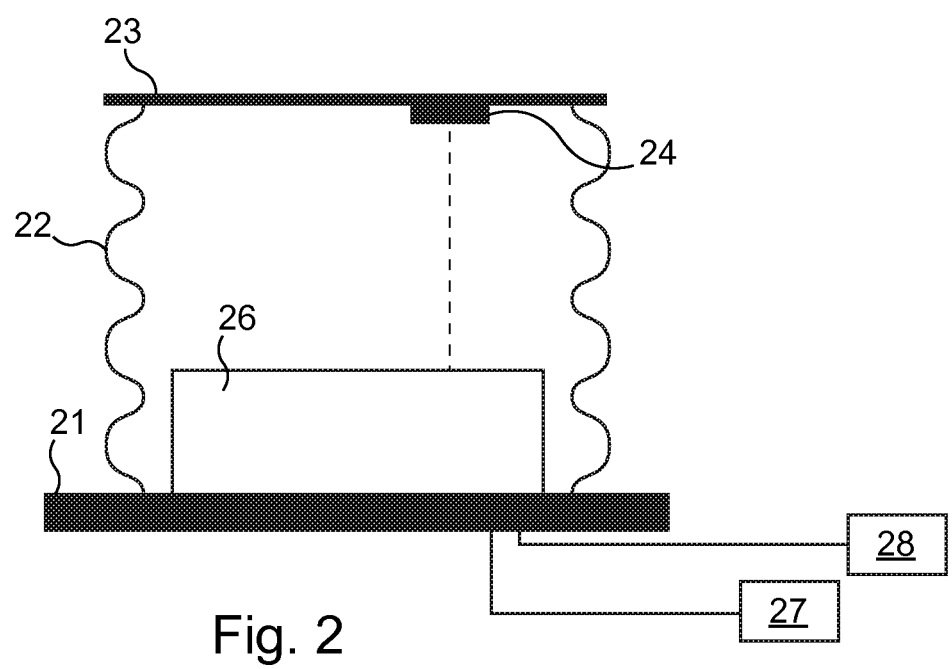
FIG. 2 is a synoptic diagram of another microbarometer according to another example embodiment of the invention, within a complete optical system.

FIG. 2 presents a variant of this first microbarometer with a bellows and with an optical transducer. Parts of this microbarometer which are equivalent to those of FIG. 1 are designated by reference signs that can be deduced from those of FIG. 1 by addition of the number 10.

Thus, this second microbarometer, designated by the general reference 20, comprises a base 21, a bellows 22, a cover 23 closing the bellows, and a mirror 24 carried by that cover and an interferometer comprising an integrated optics unit 26, a laser source 27 and a signal processing device 28.

Unlike the microbarometer of FIG. 1, the mirror and at least the integrated optics unit are situated inside the bellows; more specifically, the mirror 24 is fastened onto the inside face of the bellows, whereas the unit 26, which is fixed relative to the base as in the example of FIG. 1, is here directly fastened to the reference surface of the base, that is to say its upper face to which the bellows is fastened. Since, advantageously, the interior volume of the bellows is under a vacuum, it follows that the mirror and that unit take up no space outside the bellows, and that the unit as well as the mirror are protected in relation to external aggressions, such as dust, condensation or variations in the optical properties of the ambient air; a good degree of constancy of performance of the microbarometer results therefrom, with better independence from the environment. Another advantage is that, since there are no longer any pillars between the reference surface and that interferometric device, the sensitivity of the measurements to temperature is greatly minimized.

The implementation of a so-called "integrated" optics unit has the advantage that, contrary to the conventional optical systems, the beam emitted by the source 27, as well as the beam reflected by the mirror, are directed by optical guides formed in the body of a substrate of silica, that is to say in a material to which it is known to apply deposition-etching techniques; this makes it possible to define that unit under the designation "chip". More specifically these optical guides are produced here by local transformation of the body of a substrate of silicon so as to define therein silica guides.

These guides being in particular etched into the silica, they have the property, with the whole of the circuit they form, of being very stable over time and little sensitive to external constraints, which is not the case for a conventional optical assembly.

FIG. 3 is a synoptic diagram of an example of a guided optics interferometric component, in which the path of the light is directly inscribed into the component; Y-shaped zones can be identified therein which enable the beam to be separated into two, as well as a mixing zone which enables two beams to be combined so as to form interference fringes.

This interferometry component comprises an input line 31 configured to receive an input beam, in principle at a given frequency such that it is monochromatic; this input line arrives at a splitting zone 32 where the incident beam splits into two fractions which respectively follow a reference line 34 and a circulation line 33 which arrives at an aperture adapted to be disposed facing the mirror of which the displacement is to be detected; the orientation of that line near the aperture determines the direction in which the beam fraction which will be directed towards that mirror will strike it. The fraction directed towards the mirror is preferably greater than that which remains guided within the component, given the losses that occur outside the component between it and the mirror.

The reference line 34 continues as far as a splitting zone 35 where the beam fraction circulating in the line 34 separates into two fractions which respectively follow an output reference line 36 and a first mixing line 37.

The output aperture of the line 33 is oriented so as to collect the radiation reflected by the mirror (it is thus an input-output aperture); this line 33 comprises a splitting zone 38 configured so as to make the major part of the reflected radiation diverge outside that line 33, along a detection line 39 (were any fraction of that radiation to go back towards the input of line 31 it would not participate in the detection of the mirror displacement).

This detection line 39 arrives at a splitting zone 40 where the beam of line 39 splits into two fractions respectively along an output detection line 41 and a second mixing line 42.

The mixing lines 37 and 42 arrive at a combination zone 43 where the beams received along these lines combine to make interference fringes (the term interference pattern formation is used); in a manner known per se, two combined beams are thus emitted, in quadrature, along output measuring lines respectively denoted 44 and 45.

There is thus, at the input of the input line, an incident beam denoted R1, an emitted and reflected beam denoted R2, and a group of output beams conjointly denoted R3. It follows that this interferometry component is not limited to the mere formation of interference since it furthermore provides the guiding of various fractions towards, and from, the mirror.

FIG. 4 diagrammatically and synoptically represents the unit of FIG. 3 in an optical circuit involving the other members of the microbarometer of FIG. 1 (but the unit may also cooperate with the corresponding members of the microbarometer of FIG. 2).

Thus, the unit receives, at the input of the input line 31, a beam emitted by the source 17, sends part thereof to the mirror 14 and collects that partial beam after its reflection by the mirror, then splits that reflected beam between a fraction directly sent towards the processing device and a fraction applied to the combination zone 43; furthermore, this unit sends another part of the beam received at the input to the splitting zone so as to send one fraction thereof directly towards the processing device and another fraction towards the combination zone 43. The unit similarly emits the combined beams leaving from that zone 43 towards the processing device.

Advantageously a lens 16A is disposed at the output of the input line, facing the mirror.

This processing device analyzes the variations found in the interferometric fringes to characterize the displacement of the mirror which is the cause of those variations, and deduce therefrom the pressure variations which were the cause of that displacement. As a variant the processing device is limited to a device for digitization and storage (or recording) enabling later, in independent and offset manner, the interpretation of the output signals.

The production of an optical line such as line 33 is represented diagrammatically in FIGS. 5A to 5J, in accordance with what may be found in the aforementioned document by Malbet et al.

A homogenous substrate 100 is started with (see FIG. 5) upon which cleaning is performed by any appropriate means.

A protective layer 105 is next formed (see FIG. 5B); this is for example an aluminum layer formed by evaporation under a vacuum.

Figure 5A:
FIGS. 5A to 5J represent successive steps in the formation of the unit of FIG. 3.
Figure 5B:
Figure 5C:
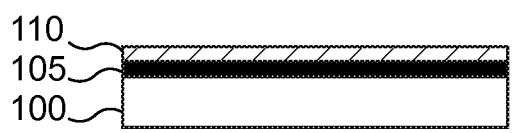

Next a photo-sensitive layer 110 is formed, typically of resin (see FIG. 5C).

Figure 5D:
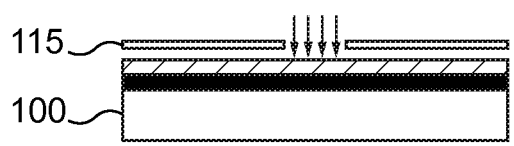

Exposure is next performed on the layer 110, for example by means of UV radiation, through a mask 115 (see FIG. 5D).

Figure 5E:
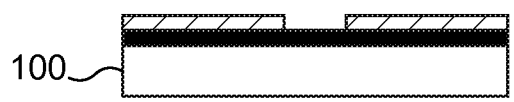

The resin is developed, which amounts to eliminating layer 110 at the location at which the exposure took place (see FIG. 5E).

Figure 5F:
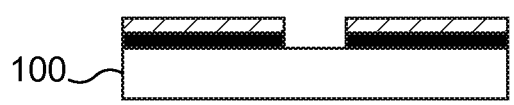
Figure 5G:

The protective layer is then attacked through openings so formed in the photo-sensitive layer (see FIG. 5F).

Figure 5H:
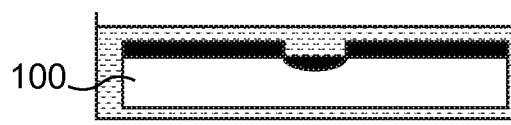
Figure 5I:
Figure 5J:
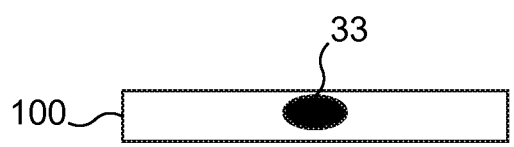

The photo-sensitive layer is then removed (see FIG. 5G) then the substrate 100 is subjected to a molten bath of appropriate composition, so as to induce ion diffusion through the openings formed in the protective layer (see FIG. 5H). When the substrate 100 is of silica, the ions that are made to diffuse within the substrate are silver ions which locally modify the optical properties of the silica.

After having removed the protective layer (see FIG. 5I), the zone of the substrate thus modified is covered with a layer such that the modified zone becomes embedded within the final substrate. This modified zone then forms an optical guide (see FIG. 5J). The covering of the modified zone may be obtained by vapor deposition of a layer of the same material as that which constitutes the substrate, or by bonding (typically by molecular bonding) to the substrate 100 of a complementary substrate.

The advantage of such an integrated optics technology lies in the simplicity of use. Contrary to a conventional optics technology, the optical beam is fully guided within the component. No adjustment is thus required to be made a posteriori. It suffices to have been able to produce the various optical paths necessary for the layout of FIG. 3 with sufficient precision.

Moreover it became apparent that this technology of integrating optical paths within the substrate made it possible to form not only the optical lines mentioned in relation to FIGS. 3 and 4, but also the various splitting zones (which may be simple Y-shaped zones) or combining zones, with the necessary precision to obtain fringes of quality in the last part of the optical circuit.

Figure 6:
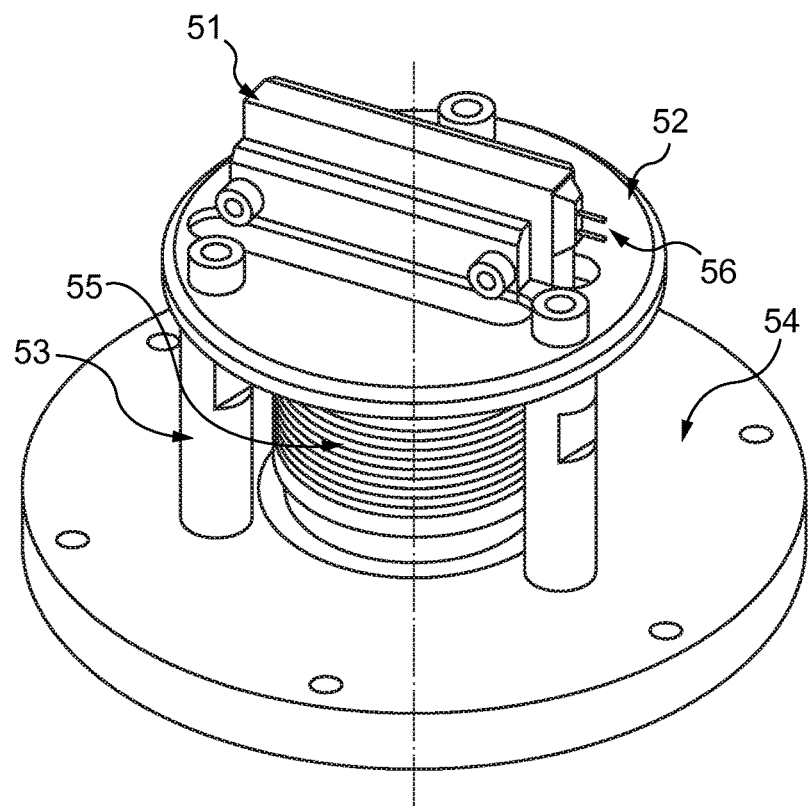
FIG. 6 is a perspective view of a microbarometer in accordance with the diagram of FIG. 1, without its lid.

FIG. 6 presents a perspective view of an example embodiment of a microbarometer with a bellows and an optical transducer in accordance with the invention, capable of measuring the variations in pressure from zero to 100 Hz.

It is constituted by the following members:
- an integrated optics interferometric component 51 in accordance with the general layout of FIG. 3,
- an interferometer support 52 of Invar, in order to take advantage of the low coefficient of expansion of that material to minimize the thermal deformations of that support,
- three bi-material pillars 53, of aluminum and Invar, in order to minimize the thermal effects on the measurement,
- a base 54,
- a bellows 55 sensitive to the infrasonic waves, of Invar in order to minimize the thermal expansion of the bellows,
- a full disk, of aluminum, and a measuring mirror (which are not visible, since concealed by the interferometer support).

The link between the interferometer support and the base is made by three bi-material pillars (5), of aluminum and Invar. The relative proportion of the materials constituting the pillars, i.e. aluminum and Invar, is advantageously adjusted for their expansion to be identical to that of the bellows 55. Thus, the thermal deformation of the bellows, and thus the displacement of the full disk due solely to the thermal effects are identical to the displacements of the support of the interferometer linked solely to the expansion of the pillars. The effect of temperature on the measurement is minimized.

The interferometer used operates advantageously with radiation at 1550 nm, in order to take advantage of the reliability of the available telecommunications components. It comprises a component formed from so-called integrated optics technology, as described above.

The mirror is for example a planar mirror as was indicated in connection with FIGS. 1 and 2. In variants not shown, it may also be a cat's eye or corner cube or any other reflective device.

Two interferometric signals in quadrature as well as photometry information leave the substrate and may leave by one of the optical paths represented under the reference 56 (the arrival of a beam coming from the optical source is made by the other path). The optical signals input to and output from the substrate are linked to the outside via optic fibers (not shown).

Figure 7:
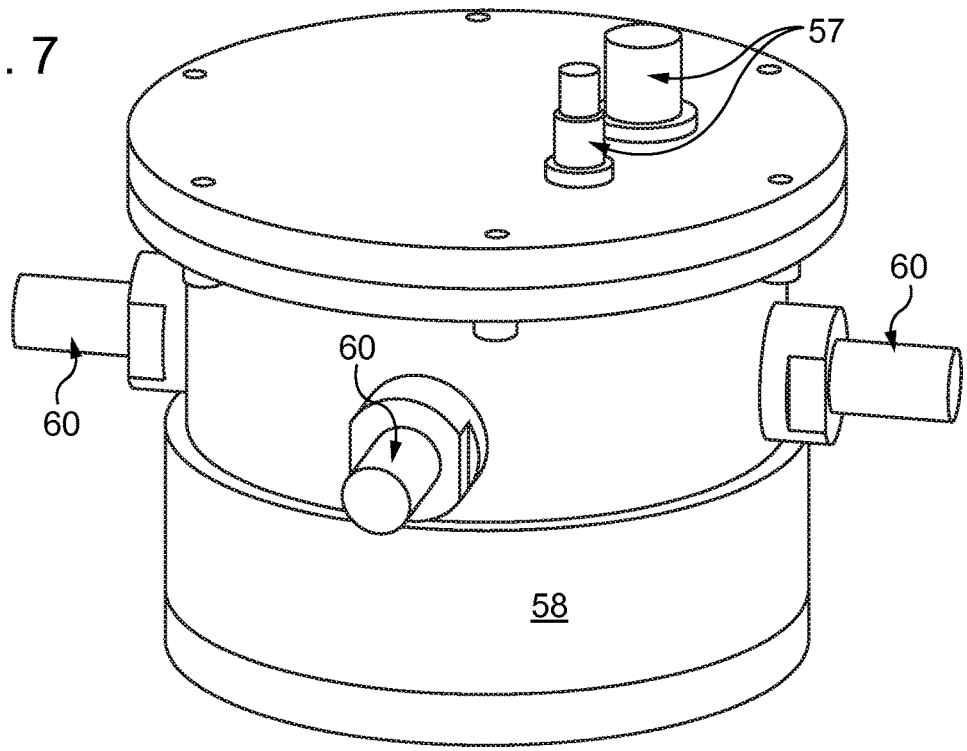
FIG. 7 is a perspective view of that microbarometer with its lid.

FIG. 7 gives an external view of the microbarometer with a bellows and an optical transducer of FIG. 6 after putting in place a lid forming an enclosed space 58 which ensures homogenization of the atmospheric pressure around the microbarometer with a bellows and with an optical transducer, fastened to its base. This lid comprises two optical connectors 57 which enable the optical signal coming from a 1550 nm source to be conveyed, as input and as output, and four air inlets 60 which make the outside pressure enter the sensor, such that the bellows is subjected to that outside pressure; an advantage in having the lid fastened in fluid-tight manner to the base is that within the enclosed space the bellows is thus sensitive only to the variations in pressure coming from the inlet apertures for outside air. As a variant, this lid may be fastened independently from the microbarometer, for example to a base such that the microbarometer is situated within the volume thus delimited, while enabling a good fluid-tightness.

The advantages of this invention are the following:
the widening of the spectral measuring band, from continuous to 50 Hz,
dynamic range making it possible to pass from atmospheric pressure to the variation of a few millipascals,
instrumentation noise less than the minimum noise measured at the surface of the Earth over the entirety of the band useful for the measurement of infrasonic waves (ref.: Bowman, Shields, O'Brien, "Infrasound station ambient noise estimates and models: 2003-2006", Infrasound Technology Workshop, Tokyo, Japan, Nov. 13-16, 2007),
minimization of the thermal sensitivity, in particular in configuration 2
placing at a distance of the detection and acquisition electronics thanks to the optic fibers,
insensitivity to electromagnetic perturbations on account of the optical interferometric measurement.

On a subsidiary basis it may be noted that a microbarometer according to the invention is of small bulk, such that it may be easily transported and installed in spaces in which it is wished to monitor infrasonic waves. The reduction in its height makes it appreciably less sensitive to the mechanical vibrations induced by the wind on the sensor itself.

The invention claimed is:

1. A microbarometer including a bellows, the microbarometer comprising:
a reference base having a reference surface;
a bellows having a first edge fastened to the reference surface of the base, and having an elongation direction perpendicular to the reference surface;
a cover closing a second edge of the bellows so as to isolate the bellows in fluid-tight manner in relation to an exterior environment, the bellows configured such that variations of elongation are directly proportional to pressure variations induced by infrasonic waves,
a reflective member carried by the cover in close proximity thereto; and
an interferometric component joined to the reference surface of the base and configured to receive a beam from a source and having an input/output optical path facing the reflective member parallel to the direction of elongation of the bellows,
the interferometric component further configured to emit a beam fraction to the reflective member and collect the beam after reflection by the reflective member,
the interferometric component further comprising optical guide lines and optical splitting and combining zones integrated within a substrate,
wherein the interferometric component is joined to the reference surface by a pillar and a coefficient of thermal expansion of the pillar perpendicular to the reference surface is substantially equal to that of the bellows.

2. The microbarometer according to claim 1, wherein the bellows is between the reference surface and the interferometric component, and the reflective member is mounted on an outside face of the cover.

3. The microbarometer according to claim 2, wherein the interferometric component is joined to the reference surface via a plurality of pillars disposed around the bellows.

4. The microbarometer according to claim 3, wherein the pillars comprise a mixture of metal and invar.

5. The microbarometer according to claim 1, wherein the interferometric component includes an input for an input signal and four outputs, the four outputs including two outputs for interferometric signals in quadrature, one output for an input signal fraction and one output for a signal of the beam reflected by the reflective member.

6. The microbarometer according to claim 1, wherein the reflective member comprises a planar mirror perpendicular to the elongation direction.

7. The microbarometer according to claim 1, wherein an interior volume of the bellows is at a rough vacuum.

8. The microbarometer according to claim 1, wherein the reflective member comprises a planar mirror extending parallel to the cover.

9. A microbarometer including a bellows, the microbarometer comprising:
a reference base having a reference surface;
a bellows having a first edge fastened to the reference surface of the base, and having an elongation direction perpendicular to the reference surface;
a cover closing a second edge of the bellows so as to isolate the bellows in fluid-tight manner in relation to an exterior environment, the bellows configured such that variations of elongation are directly proportional to pressure variations induced by infrasonic waves,
a reflective member joined to the cover; and
an interferometric component joined to the reference surface of the base and configured to receive a beam from a source and having an input/output optical path facing the reflective member parallel to the direction of elongation of the bellows,
the interferometric component further configured to emit a beam fraction to the reflective member and collect the beam after reflection by the reflective member,
the interferometric component further comprising optical guide lines and optical splitting and combining zones integrated within a substrate,
wherein the reflective member and the optical guide lines and optical splitting and combining zones of interferometric component are inside the bellows, and the reflective member is mounted on an inside face of the cover and the interferometric component is on the reference surface of the base.

10. A microbarometer comprising:
a reference base having a reference surface;
a bellows having a first edge fastened to the reference surface of the base, and having an elongation direction perpendicular to the reference surface;
a cover closing a second edge of the bellows so as to isolate the bellows in fluid-tight manner in relation to an exterior environment, the bellows configured such that variations of elongation are directly proportional to pressure variations induced by infrasonic waves,
a reflective member carried by the cover in close proximity thereto; and
an interferometric component joined to the reference surface of the base and configured to receive a beam from a source and having an input/output optical path facing the reflective member parallel to the direction of elongation of the bellows,
the interferometric component further configured to emit a beam fraction to the reflective member and collect the beam after reflection by the reflective member,
the interferometric component further comprising optical guide lines and optical splitting and combining zones integrated within a substrate and a silica substrate,
wherein the optical lines and the optical splitting and combining zones comprise one of index gradients or discontinuities in the silica.

11. A microbarometer comprising:
a reference base having a reference surface;
a bellows having a first edge fastened to the reference surface of the base, and having an elongation direction perpendicular to the reference surface;
a cover closing a second edge of the bellows so as to isolate the bellows in fluid-tight manner in relation to an exterior environment, the bellows configured such that variations of elongation are directly proportional to pressure variations induced by infrasonic waves,
a reflective member joined to the cover;
an interferometric component joined to the reference surface of the base and configured to receive a beam from a source and having an input/output optical path facing the reflective member parallel to the direction of elongation of the bellows,
the interferometric component further configured to emit a beam fraction to the reflective member and collect the beam after reflection by the reflective member,
the interferometric component further comprising optical guide lines and optical splitting and combining zones integrated within a substrate; and
a lid surrounding the bellows and the interferometric component and fastened to the base, the lid including inlet apertures that allow air into an enclosed space around the bellows, the lid further including connection conduits configured to make an optical connection to a coherent monochromatic source of radiation and to a device for processing interferometric signals.

\* \* \* \* \*